United States Patent [19]

Shallenberger et al.

[11] Patent Number: 4,664,874

[45] Date of Patent: May 12, 1987

[54] REUSABLE LOCKING TUBE INSERTION AND REMOVAL FIXTURE AND METHOD IN A RECONSTITUTABLE FUEL ASSEMBLY

[75] Inventors: John M. Shallenberger, Fox Chapel; Stephen J. Ferlan, Wilkins Township, Allegheny County, both of Pa.

[73] Assignee: Westinghouse Electric Corp., Pittsburgh, Pa.

[21] Appl. No.: 772,985

[22] Filed: Sep. 5, 1985

[51] Int. Cl.$^4$ ............... G21C 19/00; B23P 17/00
[52] U.S. Cl. ............... 376/261; 376/446; 29/400 N; 29/235
[58] Field of Search ............ 376/260, 261, 353, 446, 376/271; 29/400 N, 723, 282, 235, 453, 428; 294/86.25, 906, 86.26, 86.3, 86.32; 414/146

[56] References Cited

U.S. PATENT DOCUMENTS

| | | | |
|---|---|---|---|
| 2,971,254 | 2/1961 | Fairfield | 29/282 |
| 3,052,973 | 9/1962 | Williams | 29/282 |
| 3,770,583 | 11/1973 | Klumb et al. | 376/364 |
| 3,828,868 | 8/1974 | Jabsen | 376/353 |
| 3,960,399 | 6/1976 | Dufrene | 294/86.25 |
| 4,093,294 | 6/1978 | Taylor | 294/86.25 |
| 4,208,248 | 6/1980 | Jabsen | 376/446 |
| 4,236,967 | 12/1980 | Batjukov et al. | 414/146 |
| 4,269,661 | 5/1981 | Kmonk et al. | 376/353 |
| 4,358,421 | 11/1982 | Jabsen | 376/271 |
| 4,374,801 | 2/1983 | Albin | 376/268 |
| 4,416,848 | 11/1983 | Feutrel | 376/260 |
| 4,460,536 | 7/1984 | Krieger | 376/268 |
| 4,535,523 | 8/1985 | Leclercq | 29/400 N |

FOREIGN PATENT DOCUMENTS

| | | | |
|---|---|---|---|
| 0098774 | 1/1984 | European Pat. Off. | 376/353 |
| 0/09902 | 5/1984 | European Pat. Off. | |
| 0/82149 | 5/1986 | European Pat. Off. | |
| 0/87651 | 7/1986 | European Pat. Off. | |
| 0/89797 | 8/1986 | European Pat. Off. | |
| 2493024 | 4/1982 | France | 376/446 |

Primary Examiner—Deborah L. Kyle
Assistant Examiner—Dan Wasil

[57] ABSTRACT

A fixture for inserting and removing locking tubes into and from locking positions in a top nozzle includes a lower traveling plate and an upper traveling plate disposed above the lower plate. The lower plate has hollow flexure tubes attached to and projecting downwardly therefrom. Each flexure tube has an axially segmented sleeve portion which terminates in a lower segmented rim, with the rim being expandable to a first outside diameter greater than an inside diameter of the locking tube and collapsible to a second outside diameter less than the inside diameter of the locking tube. The upper plate has actuating rods attached to and projecting downwardly therefrom through the flexure tubes. Each actuating rod has a shaft portion which terminates in a lower enlarged nose disposed below the segmented rim of one flexure tube such that movement of the plates away from one another forcibly inserts each enlarged nose into one segmented rim sufficiently to expand the same to its first outside diameter size wherein the segmented rim will engage the lower end of each locking tube, whereas movement of the plates toward one another withdraws each enlarged nose from each segmented rim sufficiently to allow contraction of the same to its second outside diameter size wherein the segmented rim will fit through the locking tube.

12 Claims, 8 Drawing Figures

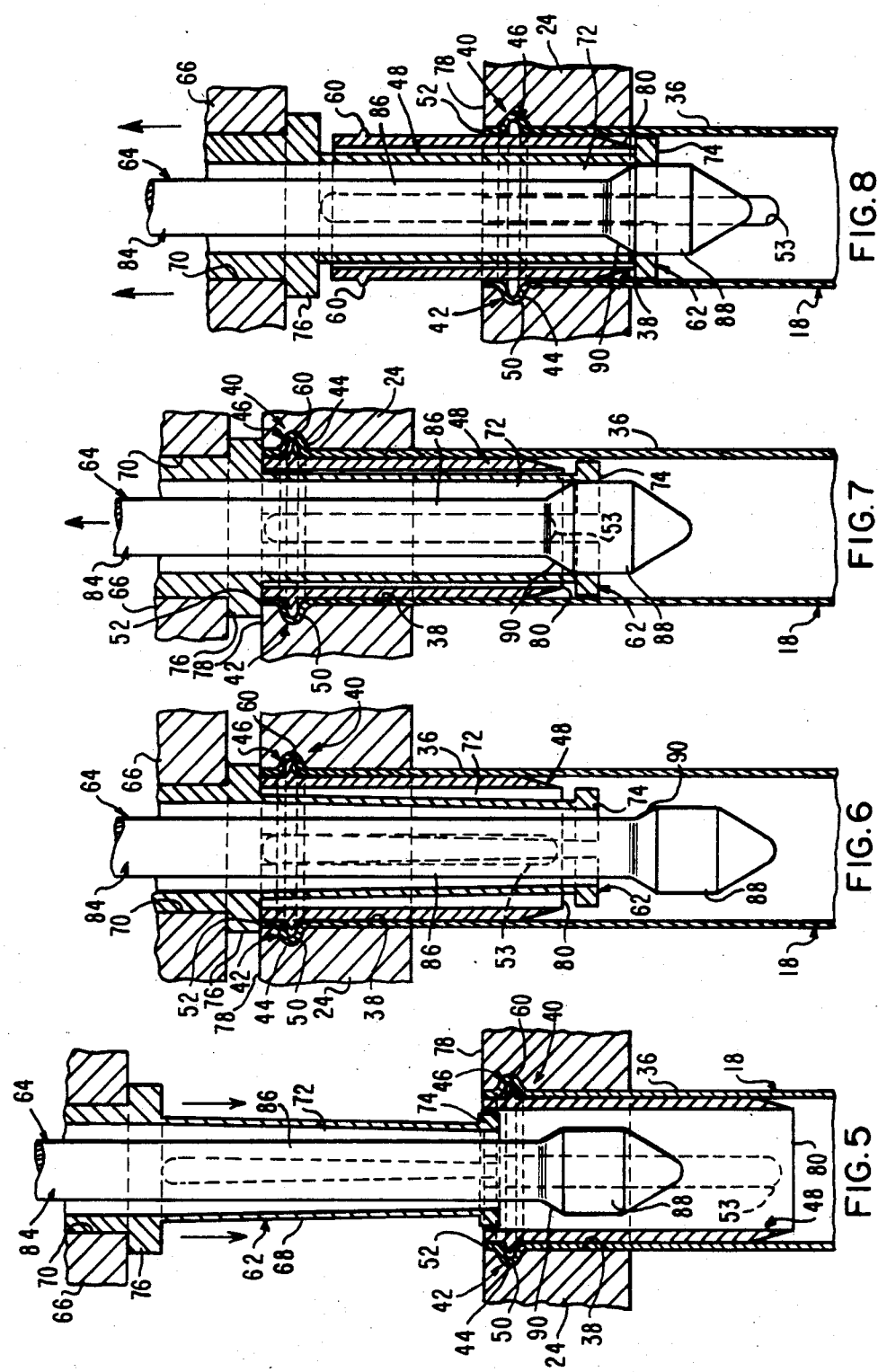

REUSABLE LOCKING TUBE INSERTION AND REMOVAL FIXTURE AND METHOD IN A RECONSTITUTABLE FUEL ASSEMBLY

CROSS REFERENCE TO RELATED APPLICATIONS

Reference is hereby made to the following copending applications dealing with related subject matter and assigned to the assignee of the present invention:

1. "Nuclear Reactor Fuel Assembly With A Removable Top Nozzle" by John M. Shallenberger et al, assigned U.S. Ser. No. 644,758 and filed Aug. 27, 1984.

2. "Locking Tube Removal and Replacement Tool And Method In A Reconstitutable Fuel Assembly" by John M. Shallenberger et al, assigned U.S. Ser. No. 670,418 and filed Nov. 9, 1984.

3. "Top Nozzle Removal And Replacement Fixture And Method In A Reconstitutable Fuel Assembly" by John M. Shallenberger et al, assigned U.S. Ser. No. 670,729 and filed Nov. 13, 1984.

4. "Locking Tube Insertion Fixture And Method In A Reconstitutable Fuel Assembly" by John M. Shallengerger et al, assigned U.S. Ser. No. 689,696 and filed Jan. 8, 1985.

5. "Locking Tube Removal Fixture And Method In A Reconstitutable Fuel Assembly" by John M. Shallenberger et al, assigned U.S. Ser. No. 695,762 and filed Jan. 28, 1985.

6. "Reusable Locking Tube In A Reconstitutable Fuel Assembly" by John M. Shallenberger et al, assigned U.S. Ser. No. 719,108 and filed Apr. 2, 1985.

BACKGROUND OF THE INVENTION

1. Field of the Invention

The present invention relates generally to fuel assemblies for nuclear reactors and, more particularly, is concerned with an insertion and removal fixture and method for installing and removing a reusable locking tube into and from a releasable locking position in a removable top nozzle of a reconstitutable fuel assembly.

2. Description of the Prior Art

In most nuclear reactors, the reactor core is comprised of a large number of elongated fuel assemblies. Conventional designs of these fuel assemblies include a plurality of fuel rods and control rod guide thimbles held in an organized array by grids spaced along the fuel assembly length and attached to the control rod guide thimbles. Top and bottom nozzles on opposite ends of the fuel assembly are secured to the guide thimbles which extend slightly above and below the ends of the fuel rods. At the top end of the fuel assembly, the guide thimbles are attached in passageways provided in the adapter plate of the top nozzle. The guide thimbles may each include an upper sleeve for attachment to the top nozzle.

During operation of such fuel assembly in a nuclear reactor, a few of the fuel rods may occasionally develop cracks along their lengths resulting primarily from internal stresses, thus establishing the possibility that fission products having radioactive characteristics may seep or otherwise pass into the primary coolant of the reactor. Such products may also be released into a flooded reactor cavity during refueling operations or into the coolant circulated through pools where the spent fuel assemblies are stored. Since the fuel rods are part of the integral assembly of guide thimbles welded to the top and bottom nozzles, it is difficult to detect and remove the failed rods.

Until recently, to gain access to these rods it was necessary to remove the affected assembly from the nuclear reactor core and then break the welds which secure the nozzles to the guide thimbles. In so doing, the destructive action often renders the fuel assembly unfit for further use in the reactor because of the damage done to both both the guide thimbles and the nozzle which prohibits rewelding.

In view of the high costs associated with replacing fuel assemblies, considerable interest has arisen in reconstitutable fuel assemblies in order to minimize operating and maintenance expenses. The general approach to making a fuel assembly reconstitutable is to provide it with a removable top nozzle. One reconstitutable fuel assembly construction, devised recently, is illustrated and described in the first U.S. patent application cross-referenced above. It incorporates an attaching structure for removably mounting the top nozzle on the upper ends of the control rod guide thimbles.

The attaching structure includes a plurality of outer sockets defined in an adapter plate of the top nozzle, a plurality of inner sockets with each formed on the upper end of one of the guide thimbles, and a plurality of removable locking tubes inserted in the inner sockets to maintain them in locking engagement with the outer sockets. Each outer socket is in the form of a passageway through the adapter plate which has an annular groove. Each inner socket is in the form of a hollow upper end portion of the guide thimble having an annular bulge which seats in the annular groove when the guide thimble end portion is inserted in the adapter plate passageway. A plurality of elongated axial slots are provided in the guide thimble upper end portion to permit inward elastic collapse of the slotted portion so as to allow the larger bulge diameter to be inserted within and removed from the annular circumferential groove in the passageway of the adapter plate. In such manner, the inner socket of the guide thimble is inserted into and withdrawn from locking engagement with the outer socket.

The locking tube is inserted from above the top nozzle into a locking position in the hollow upper end portion of the guide thimble forming the inner socket. When inserted in its locking position, the locking tube retains the bulge of the inner socket in its expanded locking engagement with the annular groove and prevents the inner socket from being moved to a compressed releasing position in which it could be withdrawn from the outer socket. In such manner, the locking tubes maintain the inner sockets in locking engagement with the outer sockets and thereby the attachment of the top nozzle on the upper ends of the guide thimbles. Furthermore, due to the vibration forces and the like, it is desirable to secure the locking tubes in their locking positions. For such purpose, suitable means, such as a pair of bulges, are formed in the upper portion of each locking tube after insertion in its locking position which bulges fit into the circumferential bulge in the upper end portion of the guide thimble.

Prior to removal of the top nozzle from, and after its replacement back on, the fuel assembly, the locking tubes must be removed from and replaced back at their locking positions. Tools and fixtures for accomplishing either removal or replacement of each locking tube, either individually one at a time or all simultaneously, are illustrated and described in the second through fifth U.S. patent applications cross-referenced above. In carrying out reconstitution of the fuel assembly, it is the common practice to discard the old locking tubes having the above construction because of the presence of partially collapsed bulges thereon which are produced by deformation upon removal of the locking tubes. Then, a full complement of new locking tubes are installed on the guide thimble upper ends and secured thereon by formation of a pair of new bulges. This practice had a number of disadvantages in terms of the large inventory of locking tubes which must be maintained, the provision which must be made for disposal of discarded irradiated locking tubes, the requirement for producing new bulges in the newly installed locking tubes and the need for inspection of the new bulges.

In order to substantially eliminate the above-mentioned disadvantages, a reusable locking tube as illustrated and disclosed in the sixth U.S. patent application cross-referenced above was recently originated. However, in order to fulfill the objectives of the reusable locking tube as a viable solution to the problems associated with the prior locking tube, a need does exist for means to effectively and efficiently carry out removal and replacement of the reusable locking tube from and into the top nozzle so as to enhance commercial acceptance thereof.

SUMMARY OF THE INVENTION

The present invention together with other components, some of which comprise the invention disclosed and claimed in the third U.S. patent application cross-referenced above, provides a system of remote-operated, submersible equipment designed to satisfy the aforementioned needs. The equipment is operable to remove and subsequently remount or replace the locking tubes and top nozzle of a reconstitutable fuel assembly, such as the one disclosed in the sixth U.S. patent application cross-referenced above, at a reactor plant. After the locking tubes and top nozzle have been removed, the upper ends of the fuel rods are exposed from the top of the reconstitutable fuel assembly. Thus, access to the fuel rods is gained for any of a variety of purposes: inspecting them for failure, removing and replacing failed rods, transferring partially spent fuel rods from one assembly to another, and/or rearrangement of fuel rods to attain better uranium utilization in the reactor core. Once inspection, removal, replacement and/or rearrangement of the fuel rods is completed, the top nozzle is placed back on the upper ends of the guide thimbles and the locking tubes replaced in their locking positions.

The present invention provides a fixture and method operable to simultaneously remove and subsequently reinstall a full complement of reusable locking tubes, such as the one disclosed in the sixth cross-referenced application, into and from a releasable locking position in a removable top nozzle of a reconstitutable fuel assembly. Components of the fixture remove and replace the reusable locking tubes in a manner which provides positive locking tube engagement and disengagement. With the fixture of the present invention mounted on the removable top nozzle of an irradiated fuel assembly to be reconstituted, the locking tubes can be withdrawn from the removable top nozzle/guide thimble joints and held within the confines of the top nozzle just above the adapter plate in accurate alignment for subsequent reinsertion. Time required to accomplish either removal or replacement of all locking tubes securing a removable top nozzle after placement of the fixture onto the top nozzle is very short, approximately one to two minutes.

Accordingly, the present invention sets forth for use with a reconstitutable fuel assembly including a top nozzle with an adapter plate having at least one passageway, at least one guide thimble with an upper end portion and an attaching structure having a hollow locking tube for releasably locking the upper end portion of the guide thimble within the passageway of the top nozzle adapter plate, a fixture and method for inserting and removing the locking tube into and from a locking position in the top nozzle.

The fixture includes: (a) locking tube engaging means being circumferentially expandable and collapsible; (b) actuating means receivable through the locking tube engaging means and being movable between disengaged and engaged positions relative to the locking tube engaging means for causing the latter to respectively assume circumferentially collapsed and expanded conditions; (c) aligning means interconnecting the actuating means and the locking tube engaging means so as to limit movement of the actuating means along a predetermined linear path between upper and lower limits relative to the locking tube engaging means, the actuating means when located at one of the limits being disposed at its disengaged position in which the tube engaging means is caused to assume its circumferentially collapsed condition in which it is disposed away from a lower end of the locking tube, the actuating means when located at the other of the limits being disposed at its engaged position in which the tube engaging means is caused to assume its circumferentially expanded condition in which it is disposed against the lower end of the locking tube; (d) biasing means interengaging the actuating and locking tube engaging means so as to bias the actuating means for movement relative to the tube engaging means so as to dispose the actuating means at its engaged position and other limit, the biasing means being yieldable for allowing the actuating means to move relative to the tube engaging means so as to dispose the actuating means at its disengaged position and one limit; and (e) operating means supporting the actuating means and being releasably lockable on the top nozzle for disposing the actuating means and therewith the locking tube engaging means, via its interconnection by the aligning means to the actuating means, through the locking tube in the top nozzle, the operating means being operable for moving the actuating means to its disengaged position and one limit to cause the locking tube engaging means to assume the circumferentially collapsed condition for facilitating disposing of the actuating means and the tube engaging means through the locking tube, the operating means also being operable for moving the actuating means to its engaged position and other limit to cause the locking tube engaging means to assume the circumferentially expanded condition for facilitating removal of the locking tube from its locking position, the operating means further being operable when the actuating means is at its engaged position and other limit and said tube engaging means is in its circumferentially expanded condition to move the actuating means and tube engaging means together away from the top nozzle and withdraw the locking tube from its locking position.

More particularly, the locking tube engaging means includes a lower traveling plate, and at least one hollow flexure tube attached to and projecting downwardly from the lower plate. The flexure tube has an axially segmented sleeve portion which terminates in a lower segmented rim, with the rim being expandable to a first outside diameter greater than an inside diameter of the locking tube and collapsible to a second outside diameter less than the inside diameter of the locking tube. The actuating means includes an upper traveling plate disposed above the lower plate, and at least one actuating rod attached to and projecting downwardly from the upper plate and through the flexure tube. The actuating rod has a shaft portion which terminates in a lower enlarged nose disposed below the segmented rim of the flexure tube such that movement of the actuating rod to its engaged position forcibly inserts its enlarged nose into the segmented rim sufficiently to expand the same to its first outside diameter size wherein the segmented rim will engage the lower end of the locking tube, whereas movement of the actuating rod to its disengaged position withdraws its enlarged nose from the segmented rim sufficiently to allow contraction of the same to its second outside diameter size wherein the segmented rim will fit through the locking tube.

Further, the operating means includes a mounting plate, and a central shaft supporting the upper traveling plate from the mounting plate and being operable for moving the upper plate toward and away from the lower plate and thereby moving the actuating rod between its disengaged position and one limit and its engaged position and other limit and for moving the upper and lower traveling plates together and thereby moving the actuating rod and the flexure tube together toward and away from the locking tube in the top nozzle. Also, the aligning means is a pair of elongated pins extending between and interconnecting the mounting plate and the upper and lower traveling plates. Each of the pins has a lower element on a lower end which defines the maximum limit of movement of the upper plate away from the lower plate.

The method for inserting and removing the locking tubes into and from their locking positions includes the operative steps of: (a) positioning a pair of upper and lower plates adjacent the adapter plate of the top nozzle such that a plurality of elongated flexure tubes, being attached to the lower plate and receiving a plurality of actuating rods attached to the upper plate, extend through the locking tubes; (b) moving the upper plate upwardly to a maximum displacement away from the lower plate so as to forcibly insert the enlarged lower noses of the actuating rods into the segmented lower rims of the flexure tubes sufficiently to expand the rims so that they engage the lower ends of the locking tubes; and (c) once the upper plate has been moved to its maximum displacement away from the lower plate, moving the upper and lower plates together so as to move the flexure tubes relative to the top nozzle and cause withdrawal of the locking tubes from their locking positions. The method further includes the steps of: (d) after removal and replacement of the top nozzle, positioning the upper and lower plates, being disposed at their maximum displacement away from one another, adjacent the adapter plate of the top nozzle so as to place the locking tubes engaged on the flexure tubes back into their locking positions; (e) moving the upper plate toward the lower plate so as to withdraw the enlarged lower noses of the actuating rods from the segmented lower rims of the flexure tubes sufficiently to allow contraction of the rims so that they disengage from the lower ends of the locking tubes; and (f) moving the upper and lower plates away from the top nozzle so as to withdraw the flexure tubes and actuating rods through the locking tubes.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIGS. 5 to 8 are enlarged fragmentary sectional views of one of the actuating rods associated with one of the flexure tubes of the fixture, depicting in FIG. 5 the insertion of the actuating rod and flexure tube into one locking tube, in FIG. 6 the actuating rod being disengaged from the flexure tube which is in a collapsed condition relative to the reusable locking tube, in FIG. 7 the actuating rod being engaged with the flexure tube which is in an expanded condition relative to the reuseable locking tube, and in FIG. 8 the removal of the actuating rod and expanded flexure tube and the locking tube therewith from the upper end of the guide thimble.

DETAILED DESCRIPTION OF THE INVENTION

Figure 1:
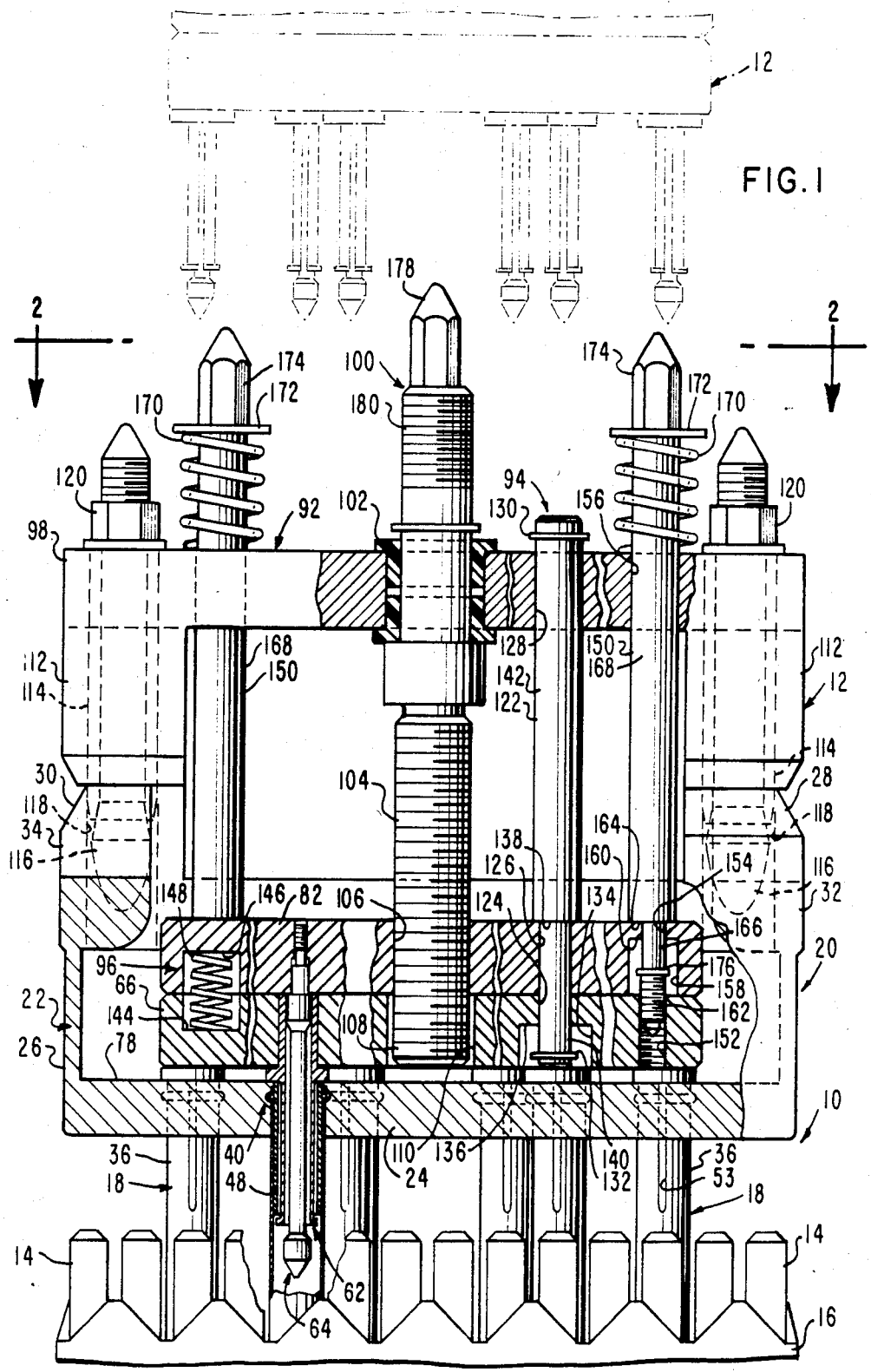
FIG. 1 is a fragmentary side elevational view of the upper end of a reconstitutable fuel assembly, with parts partially sectioned and broken away for purpose of clarity, and of the fixture of the present invention employed in removing and reinserting the reusable locking tubes from and into the top nozzle of the assembly, the fixture being shown in phantom before application to the fuel assembly and in solid line form along line 1—1 of FIG. 2 just after insertion of its flexure tubes into the locking tubes disposed in their locking positions and the two traveling plates of the fixture being shown attached together allowing the rims of the flexure tubes to assume their normal collapsed conditions in which the rims are disposed radially inward from the lower ends of the locking tubes.
Figure 2:
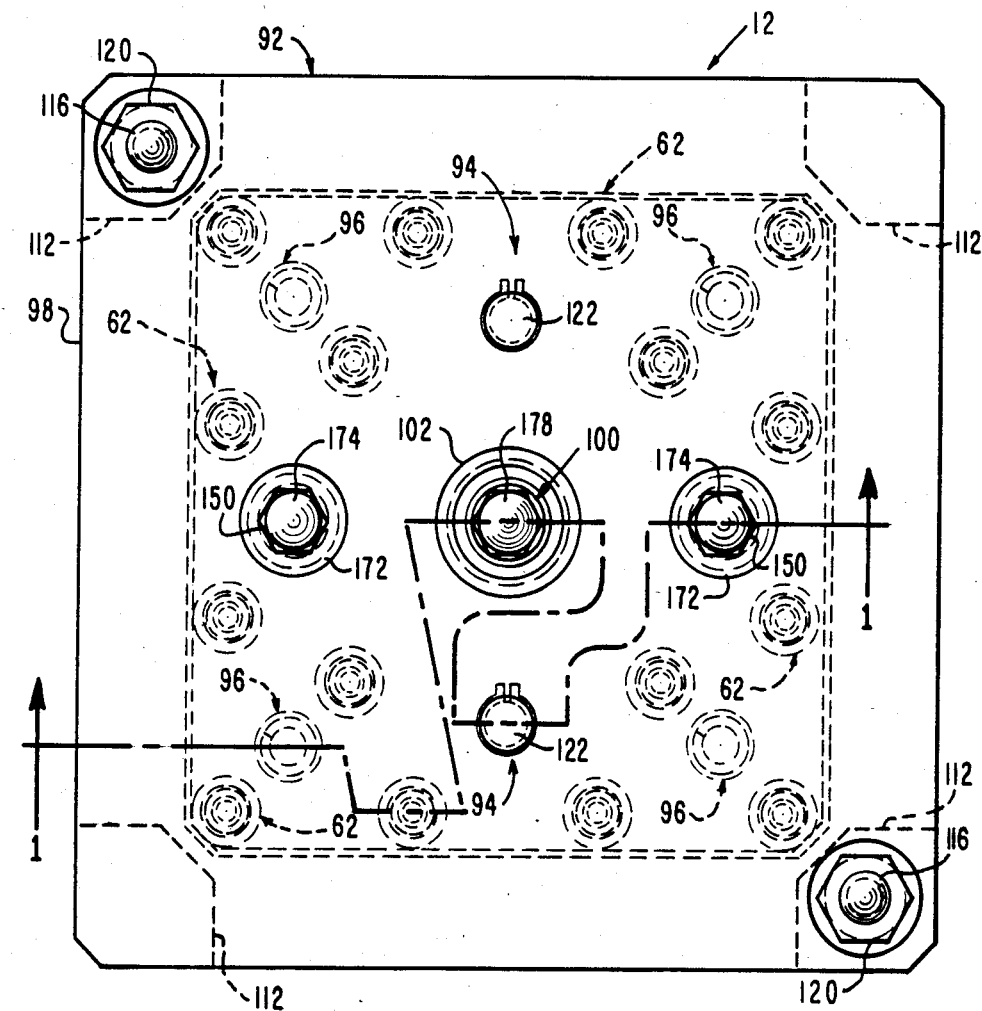
FIG. 2 is a top plan view of the fixture as seen along line 2—2 of FIG. 1.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an upper end of a reconstitutable fuel assembly, being generally designated by the numeral 10, on which the reusable locking tube insertion and removal fixture of the present invention, generally indicated at 12, is employed.

Basically, the fuel assembly 10, being of conventional construction, includes an array of fuel rods 14 held in spaced relationship to one another by a number of transverse support grids 16 (only one being shown) spaced along the fuel assembly length. Each fuel rod 14 includes nuclear fuel pellets (not shown) and is sealed at its opposite ends. The fuel pellets composed of fissile material are responsible for creating the reactive power of the nuclear reactor core in which the assembly 10 is placed. A liquid moderator/coolant such as water, or water containing boron, is pumped upwardly through the fuel assemblies of the core in order to extract heat generated therein for the production of useful work.

The reconstitutable fuel assembly 10 also includes a number of longitudinally extending guide tubes or thimbles 18 along which the grids 16 are spaced and to which they are attached. The opposite ends of the guide thimbles 18 extend a short distance past the opposite ends of the fuel rods 14 and are attached respectively to a bottom nozzle (not shown) and a top nozzle 20.

To control the fission process, a number of control rods (not shown) are reciprocally movable in the guide thimbles 18 located a predetermined positions in the fuel assembly 10. Specifically, a rod cluster control mechanism (not shown) interconnected to the control rods and associated with the top nozzle 20 is operable to move the control rods vertically in the guide thimbles 18 to thereby control the fission process in the fuel assembly 10, all in a well-known manner.

Top Nozzle Attaching Structure

As illustrated in FIG. 1, the top nozzle 20 comprises a housing 22 having a lower adapter plate 24 surrounded by four interconnected, upstanding side walls 26 with raised sets of pads 28,30 (only one pad in each set being shown) located respectively at pairs of diagonal corners 32,34 formed by the side walls 26. The control rod guide thimbles 18 have their uppermost end portions 36 coaxially positioned within the control rod passageways 38 formed through the adapter plate 24 of the top nozzle 20.

For gaining access to the fuel rods 14, the adapter plate 24 of the top nozzle 20 is removably connected to the upper end portions 36 of the guide thimbles 18 by an attaching structure, generally designated 40. As partly seen in FIGS. 1, 3 and 4, and better seen in FIGS. 5 to 8, the top nozzle attaching structure 40 of the reconstitutable fuel assembly 10 includes a plurality of outer sockets 42 (only one being shown) defined in the top nozzle adapter plate 24 by the plurality of passageways 38 (also only one being shown) which each contains an annular circumferential groove 44 (only one being shown), a plurality of inner sockets 46 (only one being shown) defined on the upper end portions 36 of the guide thimbles 18, and a plurality of removable reusable locking tubes 48 (only one being shown) inserted in the inner sockets 46 to maintain them in locking engagement with the outer sockets 42.

Each inner socket 46 is defined by an annular circumferential bulge 50 on the hollow upper end portion 36 of one guide thimble 18 only a short distance below its upper edge 52. A plurality of elongated axial slots 53 are formed in the upper end portion 36 of each guide thimble 18 to permit inward elastic collapse of the slotted end portion to a compressed position so as to allow the annular bulge 50 thereon to be inserted within and removed from the annular groove 44 via the adapter plate passageway 38. The annular bulge 50 seats in the annular groove 44 when the guide thimble upper end portion 36 is inserted in the adapter plate passageway 38 and has assumed an expanded position. In such manner, the inner socket 46 of each guide thimble 18 is inserted into and withdrawn from locking engagement with one of the outer sockets 42 of the adapter plate 24.

Finally, each reusable locking tube 48 is inserted from above the top nozzle 20 into its respective locking position in the hollow upper end portion 36 of one guide thimble 18 forming one inner socket 46. When the locking tube 48 is inserted in its locking position, it retains the bulge 50 of the inner socket 46 in the latter's expanded locking engagement with the annular groove 44 and prevents the inner socket 46 from being moved to its compressed releasing position in which it could be withdrawn from the outer socket 42. In such manner, each locking tube 48 maintains its respective one inner socket 46 in locking engagement with the outer socket 42, and thereby the attachment of the top nozzle 20 on the upper end portion 36 of each guide thimble 18.

Each locking tube 48 has at least a pair of small dimples 60 (FIGS. 5 to 8) preformed on the exterior thereof during manufacture and thus prior to insertion of the tube 48 to its locking position. The dimples 60 are so preformed by any suitable method, such as be die forming, by being coined or by spot welding, and so configured to have a generally pyramidal shape such that the metal forming the dimples substantially resists yielding and dimensional change regardless of the number of insertions and withdrawals of the tube 48 into and from the locking position. Thus, the whole locking tube per se yields, rather than the dimples 60, and then springs back to its original shape.

Also, the dimples 60 are located along the exterior of the tube 48 and have outer tips diametrically displaced from one another across the tube at a distance greater than the inside diameter of the guide thimble upper edge 52 such that when the tube is inserted to the locking position, as seen in FIGS. 5 to 7, the dimples extend into the annular bulge 50 in the guide thimble upper end portion 36 which in turn fits into the annular groove 44 defined in the passageway 38 of the adapter plate 24. In such manner, the dimples 60 provide a positive interference fit with the guide thimble upper end portion 36 above the annular bulge 50 therein and with the upper portion of the adapter plate passageway 38 which prevents inadvertent withdrawal of the locking tube 48 from the locking position.

Fixture for Inserting and Removing Reusable Locking Tubes

For effectuating inspection, removal, replacement and/or rearrangement of fuel rods 14 contained in the reconstitutable fuel assembly 10, the assembly must be removed from the reactor core and lowered into a work station (not shown) by means of a standard fuel assembly handling tool (not shown). In the work station, the fuel assembly is submerged in coolant and thus maintenance operations are performed by manipulation of remotely-controlled submersible equipment. One component of such equipment is the fixture 12 of the present invention for removing and reinserting the reusable locking tubes 48 as the first and third steps in removing and replacing the top nozzle 20. Another component of such equipment is the fixture (not shown) forming the invention illustrated and described in the third patent application cross-referenced above. After the locking tubes have been removed in the first step by the fixture of the present invention, the fixture of the cross-referenced application is used for removing the top nozzle 20 of the reconstitutable fuel assembly 10 in the second step. Then after the locking tubes have been reinserted in the third step, the latter fixture is again used for replacing the top nozzle 20 back on the guide thimbles 18.

Referring to FIGS. 1 to 8, there is shown the fixture 12 useful in inserting and removing the reusable locking tubes 48 into and from their locking positions within the top nozzle 20. The fixture 12 basically includes locking tube engaging means, generally designated 62, and actuating means, generally indicated 64.

The locking tube engaging means 62 includes a lower traveling plate 66 and a plurality of hollow flexure tubes 68 attached to and projecting downward from the lower plate 66. The lower plate 66 has a generally square configuration and a plurality of openings 70 arranged in a pattern which matches that of the plurality of guide thimbles 18 and adapter plate passageways 38 of the fuel assembly 10. Each flexure tube 68 is anchored in one of the openings 70 defined through the lower plate 66 and has a lower axially segmented sleeve portion 72 which terminates in a lower segmented rim 74. An annular exterior shoulder 76 on the flexure tube 68 above its lower segmented portion 72 provides a stop such that when the shoulder 76 is disposed on an upper surface 78 of the adapter plate 24, the length of the lower sleeve portion 72 of the flexure tube 68 compared to that of the locking tube 48 is such that its segmented rim 74 will be positioned just below a lower end 80 of the locking tube 48. The segmented sleeve portion 72 is normally in a circumferentially collapsed condition in which its segmented rim 74 has an outside diameter less than the inside diameter of the reusable locking tube 48. Thus, the segmented rim 74 is normally contracted or collapsed inwardly toward the central axis of the flexure tube 68 sufficiently to allow the flexure tube 68 to be inserted into and withdrawn from the locking tube 48.

The actuating means 64 includes an upper traveling plate 82 and a plurality of elongated solid actuating rods 84 attached to and projecting downward from the upper plate 82. The upper plate 82 has a generally square configuration matching that of the lower plate 66 and a plurality of taped holes 86 arranged in a pattern which matches that of the openings 70 in the lower plate 66. Each actuating rod 84 is anchored in one of the tapped holes 86 in the upper plate and has a shaft portion 86 which extends through one of the flexure tubes 68 and terminates in a lower enlarged nose 88 having a conical configuration.

Figure 3:
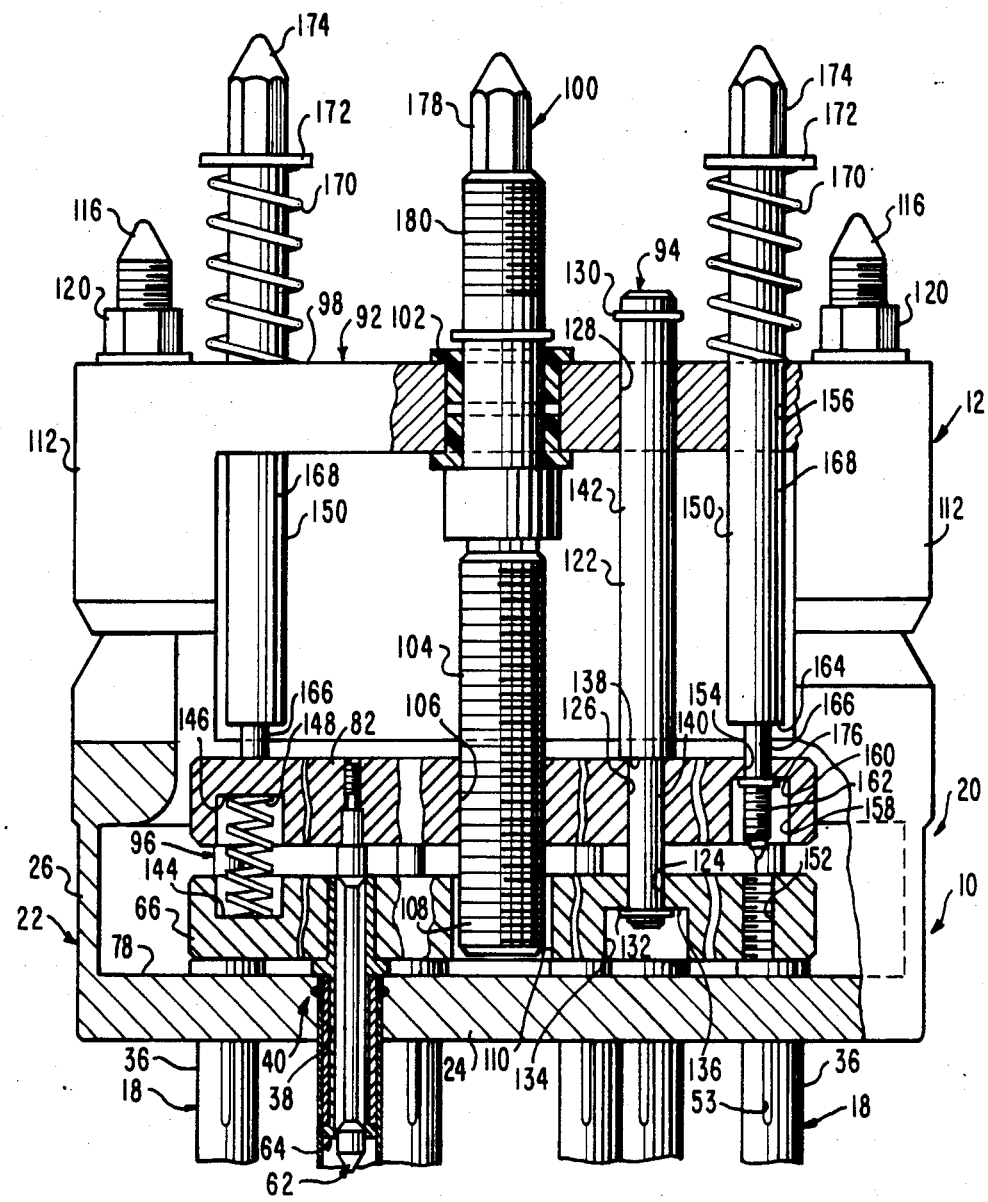
FIGS. 3 and 4 are fragmentary side elevational views similar to that of FIG. 1, but showing the fixture after its two traveling plates are detached and separated from one another so as to cause the flexure tubes to move to their expanded conditions and respectively engage and remove locking tubes from their locking positions.
Figure 4:
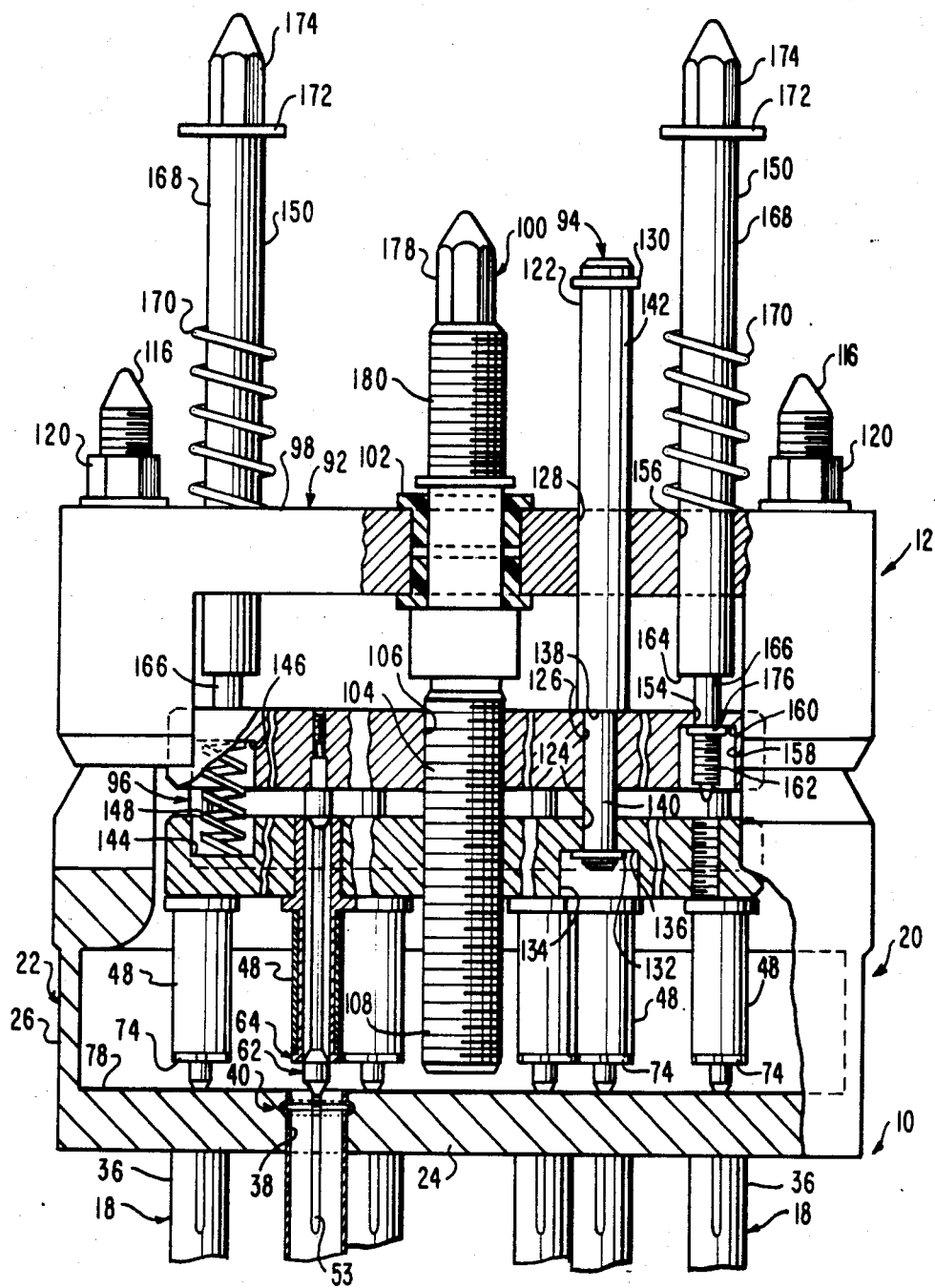

When the upper and lower plates 82,66 are positioned in contact next to one another, as seen in FIG. 1, the length of the actuating rod 84 compared to that of the flexure tube 68 is such that the enlarged nose 88 of the rod 84 is displaced a short distance below the segmented rim 74 of the tube 68 (see FIGS. 5 and 6). The outside diameter of the enlarged nose 88 of the actuating rod 84 is larger than the inside diameter of the segmented rim 74 of the flexure tube 68 such that as seen in FIG. 3, when the upper plate 82 is moved upwardly away from the lower plate 66, in an exemplary embodiment through a distance of approximately 0.35 inch, the inner annular tapered surface 90 of the enlarged nose 88 engages and expands the segmented rim 74 to a circumferentially expanded condition as the nose is forcibly inserted into the flexure tube 68, as seen in FIG. 7. The rim 74 is expanded to have an outside diameter greater than that of the inside diameter of the locking tube 48. Then, when the upper and lower plates 82,66 are moved together away from the adapter plate 24, as seen in FIG. 4, the rim 74 engages the lower end 80 of the locking tube 48 and carries the tube 48 with it, withdrawing the tube 48 from the remainder of the attaching structure 40 in the top nozzle 20, as seen in FIG. 8. Conversely, when the upper plate 82 is moved toward the lower plate 66, the enlarged nose 88 disengages and withdraws from segmented rim 74, allowing the rim 74 to contract back to its normal collapsed condition.

The fixture 12 also includes mounting means, aligning means and biasing means, being generally designated 92, 94 and 96, respectively. The mounting means 92 includes a mounting plate 98 and a central shaft 100 rotatably journalled by a bushing 102 in the mounting plate 98. The lower portion 104 of the central shaft 100 is externally threaded and threadably engaged in a center tapped hole 106 in the upper plate 82. The lower end 108 of the lower threaded portion 104 of the central shaft 100 extends through a bore 110 in the center of the lower plate 66. In such arrangement, the central shaft 100 supports the upper plate 82, but not the lower plate 66, from the mounting plate 98.

The mounting plate 98 has a generally square configuration approximately equal in size to that of the fuel assembly top nozzle 10. Four corner legs 112 on the bottom of the mounting plate 98 rest against the corner pairs of pads 28,30 of the top nozzle 20 such that the mounting plate 98 is stationarily supported on the top nozzle while operations are performed, as will be described later below, to remove and reinsert the reusable locking tubes 48. Two diagonally disposed ones of the four corner legs 112 of the mounting plate and one pad pair 28 of the top nozzle 20 include means for releasably locking the mounting plate 98 on the top nozzle 20. The releasable locking means includes a pair of hollow expandable split sleeves 114 fixedly mounted in the pair of diagonal corner legs 112 and a pair of wedge pins 116 mounted for rotational and axial movement in the respective sleeves 114. The sleeves 114 are adapted for insertion within respective bores 118 defined in the pair of diagonal corner pads 28 of the top nozzle housing 22. The wedge pins 116 having nuts 120 on their upper ends adapted to receive a suitable long-handled socket tool (not shown) for rotating the pins 116. When the pins 116 are rotated and thereby axially moved in a first direction, the sleeves 114 are caused to expand into frictional engagement with the bores 118 which secures the mounting plate 98 on the top nozzle housing 22. Conversely, when the pins 116 are rotated and thereby axially moved in an opposite second direction, the sleeves 114 are allowed to contract and release their frictional engagement with the bores 118, allowing removal of the mounting plate 98 from the top nozzle.

The aligning means 94 of the fixture 12 includes a pair of elongated pins 122 which extend between and interconnect the stationary mounting plate 98 and the lower and upper traveling plates 66,82. Aligned holes 124,126,128 are formed in the respective plates 66,82,98 for receipt of the pins 122. Upper and lower retaining rings 130,132 are attached to opposite ends of the pins 122 for preventing the pin ends from slipping through the holes 124,128 of the respective lower and stationary plates 66,98. Each of the holes 124 through the lower plate 66 have a larger diameter counterbore 134 which opens toward the upper surface 78 of the adapter plate 24 and defines a ledge 136. Also, each of the pins 122 has a shoulder 138 defined at the transition between a lower smaller diameter shaft portion 140 which extends through the holes 124,126 of the lower and upper plates 66,82 and an upper larger diameter shaft portion 142 which extends from the upper plate 82 through the hole 128 in the mounting plate 98. Thus, the aligning pins 122 not only keep the plates 66,82,98 aligned with one another, but also the lower plate ledge 136 and upper side of the upper plate 82 together in combination with the lower retaining ring 132 and pin shoulder 138 define the maximum limit of movement of the upper plate 82 away from the lower plate 66. Such maximum limit is designed to equate to the point at which the enlarged nose 88 on the actuating rod 84 expands the diameter of the segmented rim 74 on the flexure tube 68 to its circumferentially expanded condition in which it extends under the lower end 80 of the locking tube 48.

The biasing means 96 of the fixture 12 includes a plurality of pairs of opposing pockets or recesses 144,146 formed respectively in the facing surfaces of the lower and upper plates 66,82 and a plurality of coil springs 148, one of which is disposed in each pair of the opposing recesses. The springs 148 thus interengage the plates 66,82 and normally bias them for movement away from one another so as to displace them at their aforementioned maximum limit. However, the springs 148 are yieldable for allowing the plates to move toward one another to the adjacent contacting positions, as seen in FIG. 1.

Additionally, the fixture 12 includes a pair of spring-loaded shafts 150 which extend between the mounting plate 98 and the lower and upper plates 66,82. The plates 66,82,98 have respective holes 152,154,156 therein for receipt of the shafts 150. Each hole 154 in the upper plate 82 has a larger diameter counterbore 158 which opens facing toward the lower plate 66 and defines a ledge 160. The bottom ends 162 of the shafts 150 are externally threaded and adapted to threadably engage the internal threads in the holes 152 in the lower plate 66. Also, each of the shafts 150 has a shoulder 164 defined at the transition between a lower smaller diameter shaft portion 166 which extends through the holes 152,154 of the lower and upper plates 66,82 and an upper larger diameter shaft portion 168 which extends from the upper plate 82 through the hole 156 in the mounting plate 98.

Further, a spring 170 is captured about each of the shafts 150 between the upper side of the mounting plate and a washer 172 retained on the upper end of the shaft 150 below a hex head 174 thereon. The spring 170 biases the shaft in a direction away from the lower plate. Still further, each shaft 150 is slidable axially relative to the plates 66,82,98 and against the bias of the spring 170 so that the bottom end 162 of the shaft 150 can be brought into the threaded hole 152 and threaded therein for attaching and maintaining the upper plate 82 against the lower plate 66 between the shoulder 164 and the attached bottom end 162 of the shaft 150. The hex head 174 is adapted to receive a suitable long-handled tool (not shown) for forcing the shaft 150 downward to overcome the bias of the spring 170 and to rotate the shaft to thread and unthread its bottom end 162. A retainer ring 176 on the lower shaft portion 166 prevents the shaft 150 from slipping out of the hole 154 through the upper plate 82 when the bottom end 162 of the shaft 150 is unthreaded and detached from the lower plate 66 and the spring 170 then causes the shaft 150 to move axially away from the lower plate.

When the shafts 150 are detached from the lower plate 66, the biasing springs 148 in the recesses 144,146 of the plates 66,82 try to force the plates 66,82 apart to their maximum limit and thus will provide the positive plate separation necessary to cause the enlarged noses 88 on the actuating rods 84 to align with the segmented rims 74 on the flexure tubes 68, expanding the rims beneath the lower ends 80 of the reusable locking tubes 48 for removal of the tubes. Thus, when the central shaft 100 is rotated, by a suitable long-handled socket tool (not shown) connected to its hex head 178, so as to move the upper plate 82 upwardly away from the lower plate 66, the biasing springs 148 assist in their positive separation. Once the maximum limit of the upper plate 82 away from the lower plate 66 is reached, further rotation of the central shaft 100 raises both the upper and lower plates 82,66 together away from the adapter plate 24. Also, central shaft 100 has an externally threaded section 180 below its hex head 178 adapted to connect with a long-handled fixture handling tool (not shown) for installing and removing the mounting plate 98 onto and from the top nozzle 20.

The procedures for removing and reinstalling the reusable locking tubes 48 are as follows.

Removal of the locking tubes 48 from the removable top nozzle 20 for reconstitution of the fuel assembly 10 is initiated by lowering the fixture 12 (see in phantom in FIG. 1) toward the top nozzle when the fuel assembly is housed in a submerged work station. The lowering of the fixture 12 is accomplished using a long-handled tool (not shown) connected to the threaded section 180 of the central shaft 100 to guide the wedge pins 116 into the bores 118 of the top nozzle housing 22. Note that the upper and lower plates 82,66 are attached together, as seen in FIG. 1, by threading the bottom ends 162 of the shafts 150 into the tapped holes 152 in the lower plate 66 before lowering of the fixture 12. Once the mounting plate 98 is resting on the top nozzle 20, using a suitable long-handled socket tool connected to the nuts 120 on wedge pins 116, the fixture 12 can be locked on the top nozzle.

Next, another long-handled socket took (not shown) is used to engage the hex head 178 of the central shaft 100 and rotate it, causing the attached upper and lower plates 82,66 to lower until the enlarged shoulders 76 on the flexure tubes 68 rests on the adapter plate upper surface, as seen in FIG. 1. At this point, the flexure tubes 68 (and actuating rods 84) extend through the reusable locking tubes 48 and the segmented bottom rims 74 of the flexure tubes 68 are located below the lower ends 80 of the locking tubes 48. Also, the enlarged noses 88 of the actuating rods 84 protrude below the flexure tube rims 74, as seen in FIG. 6. The flexure tubes 48 remain in their collapsed conditions which enabled them to have clear passage through the hollow locking tubes.

Now, a long-handled socket tool (not shown) is used to engage the hex head 174 on each of the spring-loaded shafts 150 which are threaded at their bottom ends 162 into the holes 152 in the lower plate 66. Turning the shafts 150 the appropriate direction, the threads are disengaged and the spring 170 raises the shaft 150 away from the lower plate 66. Following next, a long-handled socket tool (not shown) is again connected to the hex head 178 on the central shaft 100 and the shaft is turned so as to cause the upper plate 82 and the actuating rods 84 attached thereon to rise. When the upper plate 82 travels through its maximum displacement or limit (for instance 0.35 inch) away from the lower plate 66 at which point the lower retaining rings 132 on the aligning pins 122 contact the ledges 136 in the counterbores 134 in the lower plate 66, as seen in FIG. 3, the lower plate 66 is then moved upward also.

At the point where both plates 66,82 begin to travel upward, as seen in FIG. 4, the segmented rims 74 on the flexure tubes 68 are expanded beneath the locking tubes 48 by the noses 88 on the actuating rods 84, as seen in FIGS. 7 and 8, thus engaging and withdrawing the locking tubes 48 simultaneously from the removable top nozzle adapter plate 24. The central shaft 100 is turned until the end of mechanical travel is reached at which elevation the locking tubes are disengaged from the remainder of the top nozzle attaching structure 40 and the top nozzle 20 is then free to be raised off the upper end portions 36 of the guide thimbles 18.

For reinstallation of the reusable locking tubes 48 back into the top nozzle attaching structure 40 after the fuel assembly 10 has been reconstituted and the top nozzle 20 has been replaced on the guide thimbles 18 of the fuel assembly 10, a long-handled socket tool (not shown) is engaged with the hex head 178 on the central shaft 100. The central shaft 100 is then turned in the appropriate direction to lower the two plates together and the captured locking tubes 48 until the enlarged shoulders 76 on the flexure tubes 68 rests against the adapter plate 24. At this point, the locking tubes 48 have been reinserted into their corresponding attaching structures 40. Turning of the central shaft 100 is continued until the upper plate 82 rests against the lower plate 66. Now, the rims 74 on the flexure tubes 68 have contracted from under the locking tubes 48.

The hex head 174 on the shafts 150 are now engaged and the weight of the tool is used to compress the springs 170, forcing the shafts downward so that the bottom ends 162 can be threaded into the holes 152 in the lower plate 66. When the shafts 150 have been so threaded to the lower plate 66, the upper plate 82 is attached to the lower plate 66 so as to prevent expansion of the flexure tubes 68 by the actuating rods 84 during removal thereof which happens next.

With a suitable long-handled socket tool engaged to the hex head 178 on the central shaft 100, the shaft is turned, raising the plates together and the flexure tubes 68 and actuating rods 84 therewith out of the locking tubes 48 and clear of the top nozzle adapter plate 24. Finally, using suitable tools (not shown) the wedge pins 116 are released and the fixture 12 unlocked from the top nozzle 20, and the fixture 12 is then removed from the reconstituted fuel assembly 10.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A locking tube insertion and removal fixture for use with a reconstitutable fuel assembly including a top nozzle with an adapter plate having at least one passageway, at least one guide thimble with an upper end portion, and an attaching structure having a hollow locking tube insertable and removable into and from a locking position in the upper end portion of the guide thimble for releasably locking the upper end portion of the guide thimble within the passageway of the top nozzle adapter plate, said fixture comprising:

(a) locking tube engaging means including a lower traveling plate and at least one hollow flexure tube attached to and projecting downwardly from said lower plate and being circumferentially expandable and collapsible, said flexure tube having an axially segmented sleeve portion which terminates in a lower segmented rim, said rim being expandable to a first outside diameter greater than an inside diameter of said locking tube and collapsible to a second outside diameter less than said inside diameter of said locking tube;

(b) actuating means including an upper traveling plate disposed above said lower plate and at least one actuating rod attached to and projecting downwardly from said upper plate and received through said flexure tube, said upper and lower plates being movable toward and away from each other for causing movement of said actuating rod between disengaged and engaged positions relative to said flexure tube for causing the latter to respectively assume circumferentially collapsed and expanded conditions, said actuating rod having a shaft portion which terminates in a lower enlarged nose disposed below said segmented rim of said flexure tube such that movement of said plates away from one another moves said acturating rod to its engaged position forcibly inserting its enlarged nose into said segmented rim sufficiently to expand the same to its first outside diameter size wherein said segmented rim will engage said lower end of said locking tube, whereas movement of said plates toward one another moves said actuating rod to its disengaged position withdrawing its enlarged nose from said segmented rim sufficiently to allow contraction of the same to its second outside diameter size wherein said segmented rim will fit through said locking tube;

(c) aligning means interconnecting said upper and lower traveling plates so as to limit movement of said upper plate to along a predetermined linear path between upper and lower limits relative to said lower plate, said actuating rod when said upper plate is located at one of said limits being disposed at its disengaged position in which said flexure tube is caused to assume its circumferentially collapsed condition in which it is disposed away from the lower end of said locking tube, said actuating rod when said upper plate is located at the other of said limits being disposed at its engaged position in which said flexure tube is caused to assume its circumferentially expanded condition in which it is disposed against the lower end of said locking tube;

(d) biasing means interengaging said upper and lower traveling plates so as to bias said plates for movement away from one another to said other limit and thereby said actuating rod for movement relative to said flexure tube so as to dispose said actuating rod at its engaged position, said biasing means yieldable for allowing said plates to move toward one another to said one limit and thereby said actuating rod to move relative to said flexure tube so as to dispose said actuating rod at its disengaged position; and (e) operating means supporting said upper plate and being releasably lockable on said top nozzle for disposing said upper plate and therewith said lower plate, via its interconnection by said aligning means to said upper plate, such that said actuating rod and flexure tube together extend through said locking tube in said top nozzle, said operating means being operable for moving said upper plate toward said lower plate to said one limit and thereby said actuating rod to its disengaged position to cause said flexure tube to assume said circumferentially collapsed condition for facilitating disposing of said actuating rod and said flexure tube through said locking tube, said operating means also being operable for moving said upper plate away from said lower plate to said other limit and thereby said actuating rod to its engaged position to cause said flexure tube to assume said circumferentially expanded condition for facilitating removal of said locking tube from its locking position, said operating means further being operable when said upper and lower plates are disposed adjacent one another at said other limit and thereby said actuating rod is at its engaged position and said flexure tube is in its circumferentially expanded condition to move said upper and lower plates together away from said top nozzle and withdraw said locking tube from its locking position.

2. The fixture as recited in claim 1, wherein said operating means includes:
   a mounting plate; and
   a central shaft supporting said upper traveling plate from said mounting plate and being operable for moving said upper plate toward and away from said lower plate and thereby moving said actuating rod between its disengaged position and one limit and its engaged position and other limit and for moving said upper and lower traveling plates together and thereby moving said actuating rod and said flexure tube together toward and away from said locking tube in said top nozzle.

3. The fixture as recited in claim 1, wherein said operating means also includes means for releasably locking said mounting plate to said top nozzle.

4. The fixture as recited in claim 3, wherein said means for releasably locking said mounting plate includes a pair of hollow expandable split sleeves fixedly mounted in a pair of opposite diagonal corners of said mounting plate and a pair of wedge pins mounted for axial movement in said respective sleeves, said sleeves being insertable within respective bores defined in a pair of opposite diagonal corners of said top nozzle such that when so inserted and said wedge pins are moved in a first direction said sleeves expand into frictional engagement with said bores and secure said mounting plate to said top nozzle, whereas when said wedge pins are moved in a second opposite direction said sleeves contract and release their frictional engagement with said bores allowing removal of said mounting plate from said top nozzle.

5. The fixture as recited in claim 1, wherein said biasing means includes:
   a plurality of pairs of opposing recesses formed in said upper and lower traveling plates; and
   a plurality of springs, each spring being disposed in one of said pairs of opposing recesses in said traveling plates.

6. The fixture as recited in claim 2, wherein said aligning means is a pair of elongated pins extending between and interconnecting said mounting plate and said upper and lower traveling plates, each of said pins having lower elements on a lower end portion which defines said maximum limit of movement of said upper plate away from said lower plate.

7. The fixture as recited in claim 2, wherein said operating means further includes:
   a pair of shafts extending between and interconnecting said mounting plate and said upper and lower traveling plates, each of said shafts being rotatable and axially slidable relative to said plates and at its lower end adapted to attach to said lower plate upon rotation of said shaft in one direction and detach from said lower plate upon rotation of said shaft in an opposite direction; and
   an element on each of said shafts being engagable with said upper traveling plate for retaining said upper plate against said lower plate when said lower end of each said shaft is attached to said lower plate.

8. The fixture as recited in claim 7, wherein said operating means further includes a pair of springs, each spring coupled between one of said shafts and said mounting plate so as to bias said shaft and thereby its lower end in a direction away from said lower plate when said lower shaft end is detached from said lower plate.

9. A locking tube insertion and removal fixture for use with a reconstitutable fuel assembly including a top nozzle with an adapter plate having a plurality of passageways, a plurality of guide thimbles with upper end portions, and attaching structures having hollow locking tubes insertable and removable into and from locking positions in the upper end portions of the guide thimbles for releasably locking the upper end portions of the guide thimbles within the passageways of the top nozzle adapter plate, said fixture comprising:
   (a) lower supporting means;
   (b) a plurality of locking tube engaging means attached to and projecting downwardly from said lower supporting means, said locking tube engaging means being circumferentially expandable and collapsible;
   (c) upper supporting means;
   (d) a plurality of actuating means attached to and projecting downwardly from said upper supporting means, said actuating means receivable through said locking tube engaging means and movable between disengaged and engaged positions relative to said tube engaging means for causing the latter to respectively assume circumferentially collapsed and expanded conditions;
   (e) aligning means interconnecting said upper and lower supporting means so as to maintain them in a predetermined alignment with respect to one another and movable along a predetermined linear path when said supporting means are moved toward and away from one another, said aligning means defining a maximum limit at which said upper and lower supporting means can move away from one another, said limit being such that said actuating means are at their engaged positions in which said tube engaging means are caused to assume their circumferentially expanded conditions in which they are disposed against respective lower ends of said locking tubes;
   (f) biasing means interengaging said upper and lower supporting means so as to bias them for movement away from one another, said biasing means being yieldable for allowing said upper and lower supporting means to be moved toward one another;

(g) mounting means supporting said upper supporting means and being releasably mountable to said top nozzle for disposing said upper and lower supporting means adjacent to said adapter plate with said actuating means and therewith said locking tube engaging means received through said locking tubes in said top nozzle, said mounting means being operable for moving said upper supporting means relative to said lower supporting means and thereby move said actuating means to their engaged positions and said locking tube engaging means to their expanded conditions and being further operable, once said upper supporting means reaches its maximum limit away from said lower supporting means, for moving both of said upper and lower supporting means away from said top nozzle for withdrawing said locking tubes from their locking positions; and (h) operating means interconnectible with said upper and lower supporting means and operable in an attaching mode so as to interconnect and cause movement of said supporting means toward one another against said bias of said biasing means so as to place said supporting means adjacent one another such that said actuating means are at their disengaged positions in which said tube engaging means are caused to assume their circumferentially collapsed conditions allowing insertion into and withdrawal from said locking tubes, said operating means being operable in a detaching mode so as to disconnect and allow movement of said supporting means away from one another toward said maximum limit such that said actuating means are at their engaged positions in which said tube engaging means are caused to assume their circumferentially expanded conditions for facilitating withdrawal of said locking tubes from their locking positions;

(i) said lower supporting means being a lower traveling plate, and said locking tube engaging means being a plurality of hollow flexure tubes attached to and projecting downwardly from said lower plate and arranged in a pattern which matches that of said plurality of guide thimbles, each of said flexure tubes having an axially segmented sleeve portion which terminates in a lower segmented rim, said rim being expandable to a first outside diameter greater than an inside diameter of said locking tube and collapsible to a second outside diameter less than said inside diameter of said locking tube;

(j) said upper supporting means being an upper traveling plate disposed above said lower plate, and said actuating means being a plurality of actuating rods attached to and projecting downwardly from said upper plate and through said respective flexure tubes, each of said actuating rods having a shaft portion which terminates in a lower enlarged nose disposed below said segmented rim of said respective flexure tube such that movement of said upper plate away from said lower plate causes movement of said actuating rod to its engaged position forcibly inserting its enlarged nose into said segmented rim sufficiently to expand the same to its first outside diameter size wherein said segmented rim will engage said lower end of said locking tube, whereas movement of said upper plate toward said lower plate causes movement of said actuating rod to its disengaged position withdrawing its enlarged nose from said segmented rim sufficiently to allow contraction of the same to its second outside diameter size wherein said segmented rim will fit through said locking tube.

10. The fixture as recited in claim 9, wherein said mounting means includes:
   a mounting plate; and
   a central shaft supporting said upper traveling plate from said mounting plate and being operable for moving said upper plate toward and away from said lower plate and thereby moving said actuating rods between their disengaged and engaged positions and for moving said upper and lower traveling plates together and thereby moving said actuating rods and said flexure tubes together toward and away from said locking tubes in said top nozzle.

11. A locking tube insertion and removal method for use with a reconstitutable fuel assembly including a top nozzle with an adapter plate having a plurality of passageways, a plurality of guide thimbles with upper end portions, and attaching structures having hollow locking tubes insertable and removable into and from locking positions in the upper end portions of the guide thimbles for releasably locking the upper end portions of the guide thimbles within the passageways of the top nozzle adapter plate, said method comprising the steps of:

(a) positioning a pair of upper and lower plates adjacent the adapter plate of the top nozzle such that a plurality of elongated flexure tubes, being attached to the lower plate and receiving a plurality of actuating rods attached to the upper plate, extend through the locking tubes;

(b) moving the upper plate upwardly to a maximum displacement away from the lower plate so as to forcibly insert the enlarged lower noses of the actuating rods into the segmented lower rims of the flexure tubes so that said rims engage the lower ends of the locking tubes; and (c) once the upper plate has been moved to its maximum displacement away from the lower plate, moving the upper and lower plates together so as to move the flexure tubes relative to the top nozzle and cause withdrawal of the locking tubes from their locking positions.

12. The method as recited in claim 11, further comprising the steps of:

(d) after removal and replacement of the top nozzle, positioning the upper and lower plates, being disposed at their maximum displacement away from one another, adjacent the adapter plate of the top nozzle so as to place the locking tubes engaged on the flexure tubes back into their locking positions;

(e) moving the upper plate toward the lower plate so as to withdraw the enlarged lower noses of the actuating rods from the segmented lower rims of the flexure tubes sufficiently to allow contraction of the rims so that they disengage from the lower ends of the locking tubes; and (f) moving the upper and lower plates away from the top nozzle so as to withdraw the flexure tubes and actuating rods through the locking tubes.

* * * * *